United States Patent
Warner et al.

(10) Patent No.: US 10,214,139 B1
(45) Date of Patent: Feb. 26, 2019

(54) ROTATABLE REVERSE LIGHT FOR VEHICLE

(71) Applicant: Valeo North America, Inc., Troy, MI (US)

(72) Inventors: Gavin Warner, Troy, MI (US); Cameron Crisp, Troy, MI (US); Tung Ho, Troy, MI (US); Nathan Montgomery, Troy, MI (US); John Orisich, Troy, MI (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 15/686,629

(22) Filed: Aug. 25, 2017

(51) Int. Cl.
*B60Q 1/22* (2006.01)
*B60Q 1/30* (2006.01)
*B60Q 1/26* (2006.01)
*F21V 14/02* (2006.01)
*F21S 43/00* (2018.01)
*B60Q 1/44* (2006.01)

(52) U.S. Cl.
CPC .............. *B60Q 1/22* (2013.01); *B60Q 1/2657* (2013.01); *B60Q 1/30* (2013.01); *F21S 43/00* (2018.01); *F21V 14/02* (2013.01); *B60Q 1/44* (2013.01)

(58) Field of Classification Search
CPC .......... B60Q 1/22; B60Q 1/30; B60Q 1/2657; B60Q 1/44; F21S 43/00; F21V 14/02
USPC ........................................................... 701/49
See application file for complete search history.

(56) References Cited

U.S. PATENT DOCUMENTS

| | | | | |
|---|---|---|---|---|
| 4,855,878 | A * | 8/1989 | Vu | B60Q 1/22 362/506 |
| 5,002,309 | A * | 3/1991 | Vecellio | B05C 7/04 180/312 |
| 5,165,830 | A * | 11/1992 | Vecellio | B05B 13/00 104/20 |
| 6,515,583 | B1 * | 2/2003 | Lamparter | B60Q 1/503 340/433 |
| 8,851,727 | B1 * | 10/2014 | Theisen | B60Q 11/005 248/486 |

FOREIGN PATENT DOCUMENTS

| DE | 102012020414 | 4/2014 |
|---|---|---|
| FR | 2929193 | 10/2009 |

* cited by examiner

*Primary Examiner* — Muhammad Shafi
(74) *Attorney, Agent, or Firm* — Oblon, McClelland, Maier & Neustadt, L.L.P.

(57) ABSTRACT

Described herein are a rotatable reverse light, and a taillight. The rotatable reverse light includes a reverse light, a shaft connected to the reverse light and configured to rotate the reverse light, a motor connected to the shaft to rotate the reverse light about a longitudinal axis of the shaft to orient the reverse light to a desired position, and a reverse light controller. The controller is configured to receive a driving mode of a vehicle, in response to a parking mode of the vehicle, receive a rotation input related to the desired position, generate a rotation signal based on the rotation input, and transmit the rotation signal to the motor to orient the reverse light to the desired position.

18 Claims, 8 Drawing Sheets

ROTATABLE REVERSE LIGHT FOR VEHICLE

BACKGROUND

Field of the Disclosure

This disclosure relates generally to improvements to a reverse light of a vehicle. More particularly the present disclosure relates to a rotating reverse light that operate when the vehicle is parked.

Description of the Related Art

Typically, reverse lights (also called backup lights) are a fixed part of a typical taillight that is turned on when the vehicle is in a reverse gear (also called a reverse mode) or in a parking mode. Reverse lights functions include warning other vehicles or people around that the vehicle is about to move backward, and provide illumination when the vehicle is backing up.

SUMMARY

According to an embodiment of the present disclosure, there is provided a rotatable reverse light. The rotatable reverse light includes a reverse light, a shaft connected to the reverse light and configured to rotate the reverse light, a motor connected to the shaft to rotate the reverse light about a longitudinal axis of the shaft to orient the reverse light to a desired position, and a reverse light controller. The controller is configured to receive a driving mode of a vehicle, in response to a parking mode of the vehicle, receive a rotation input related to the desired position, generate a rotation signal based on the rotation input, and transmit the rotation signal to the motor to orient the reverse light to the desired position.

The shaft is a spring loaded to facilitate replacement of the reverse light. Furthermore, the spring loaded shaft is telescopic that makes tail lamps compact.

The rotation input includes an amount of rotation and a direction of rotation.

The controller is further configured to detect a change of driving mode from the parking mode, in response to the mode change, determine an amount of rotation and a direction of rotation based on a current position of the motor, and orient the reverse light to a normal position based on the amount and the direction of rotation determined. The controller is further configured to control an intensity of the reverse light.

Furthermore, according to an embodiment of the present disclosure, there is a rotatable reverse light of a vehicle. The rotatable reverse light includes a reverse light, a shaft connected to the reverse light and configured to rotate the reverse light, a position sensor configured to measure a position of the reverse light, a motor connected to the shaft to rotate the reverse light about a longitudinal axis of the shaft to orient the reverse light to a desired position, and a reverse light controller. The controller is configured to receive a driving mode including a parking mode of a vehicle, in response to the parking mode of the vehicle, receive a rotation input related to the desired position and the position of the reverse light, generate a rotation signal based on the rotation input and the position of the reverse light, and transmit the rotation signal to the motor to orient the reverse light to the desired position.

The shaft is a spring loaded to facilitate replacement of the reverse light. Furthermore, the spring loaded shaft is telescopic that makes tail lamps compact.

The rotation input includes an amount of rotation and a direction of rotation.

The controller is further configured to detect a change of driving mode from the parking mode, in response to the mode change, determine an amount of rotation and a direction of rotation based on a current position of the motor, and orient the reverse light to a normal position based on the amount and the direction of rotation determined. The controller is further configured to control an intensity of the reverse light.

Furthermore, according to an embodiment of the present disclosure, there is provided a taillight of a vehicle. The taillight includes a reverse light, a brake light surrounding the reverse light, a shaft to rotate the reverse light and the brake light configured to rotate the reverse light relative to the brake light, a motor connected to the shaft to rotate the reverse light in a desired position, and a reverse light controller. The controller is configured to receive a driving mode of a vehicle, in response to a parking mode, receive rotation input, generate rotation signal, and transmit the rotation signal to the motor to orient the reverse light to the desired position.

The shaft is a spring loaded to facilitate replacement of the reverse light. Furthermore, the spring loaded shaft is telescopic that makes tail lamps compact.

The rotation input includes an amount of rotation and a direction of rotation.

The controller is further configured to detect a change of driving mode from the parking mode, in response to the mode change, determine an amount of rotation and a direction of rotation based on a current position of the motor, and orient the reverse light to a normal position based on the amount and the direction of rotation determined. The controller is further configured to control an intensity of the reverse light.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

It is to be understood that terms such as "front," "rear," and the like that may be used herein merely describe points of reference and do not necessarily limit embodiments of the present disclosure to any particular orientation or configuration. Furthermore, terms such as "first." "second," "third," etc., merely identify one of a number of portions, components, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, and any values therebetween.

Often times, several activities such as unloading things at night, setting up a camp, replacing flat tire, etc., are performed around a vehicle, when in parked mode. While performing activities around the vehicle, illumination or lighting of a surrounding area of the vehicle may be desirable for better visibility. To illuminate multiple areas around the rear of the vehicle (e.g., around a back end of a truck), multiple lights sources positioned in different parts of the vehicle (e.g., along a side and/or the bed of the vehicle) are used. However, each additional light source adds extra cost and parts, which is undesirable.

According to the present disclosure, a modified reverse light to illuminate multiple areas around the rear end of a vehicle is provided. The modified reverse light provides assistive task lighting feature without addition of light sources, thus no additional light source/module are used.

Typically, reverse lights (also called backup lights) are a fixed part of a typical taillight that is turned on when the vehicle is in reverse mode or in parking mode. Reverse lights functions include warning other vehicles or people around that the vehicle is about to move backward, and provide illumination when the vehicle is backing up. According to standards, reverse lights on a vehicle must be white in color, and these come standard on all vehicles. The typical reverse lights are not configured to provide assistive task lighting (ATL). ATL is a feature of a lighting apparatus, where the lighting apparatus can be used to provide a user when performing an activity or task around the vehicle. ATL function can include illuminating a bed of a trunk, sides of a rear end of the vehicle, etc. A rotatable reverse light of a vehicle, according to the present disclosure, incorporates multiple functions including warning and illumination when backing up, and ATL without addition of extra lamps or lighting apparatus.

Figure 1:
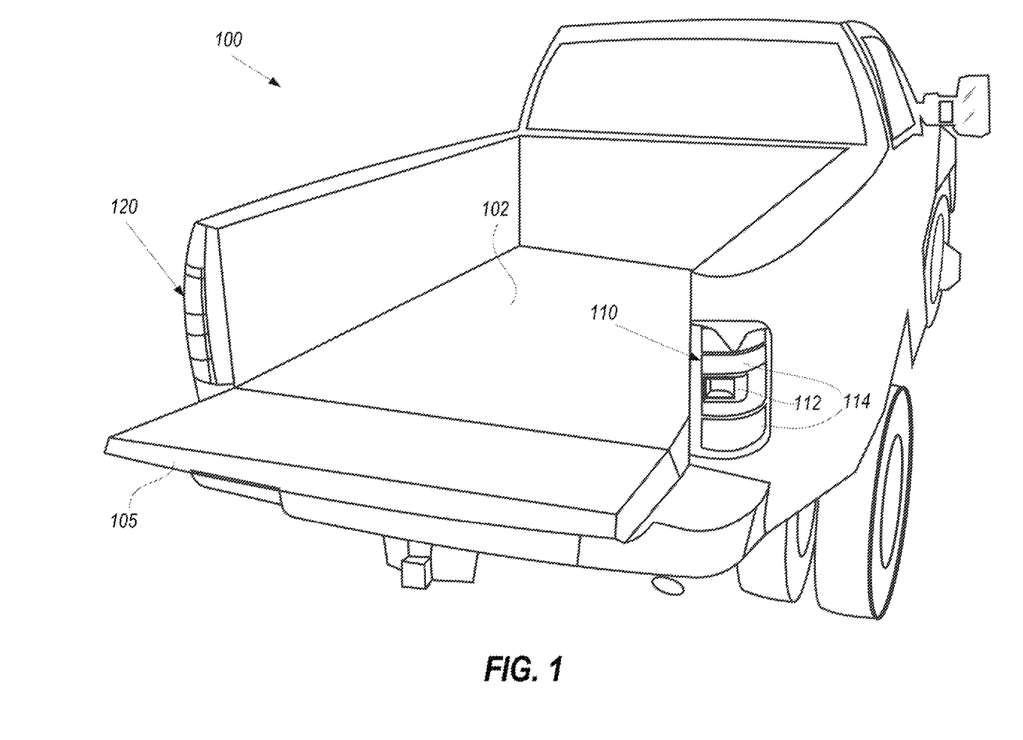
FIG. 1 illustrates a vehicle with a rotatable reverse light according to an exemplary embodiment of the present disclosure.

FIG. 1 illustrates a vehicle 100 with taillights 110 and 120 according to an exemplary embodiment of the present disclosure. The vehicle 100 can be a truck, a sports utility vehicle (SUV), a sedan or other vehicle type having a reverse light. The taillight 110 (or 120) includes a rotatable reverse light 112 that can rotate about a vertical axis relative to a fixed adjacent lamp 114. The adjacent lamp 114 can be a brake light, indicator lamp, or other lamps typically included in the taillight 110. The rotatable reverse light 112 provides a combination of warning and illumination when backing up and ATL functions such as illuminating areas surrounding a rear end and sides of the vehicle 100 including a bed 102 and a tailgate 105. The ATL feature can help a user at night while working in the bed 102 of the vehicle 100 (e.g., unloading a cargo from the bed of the truck), or around the vehicle 100 such as setting up a tent, campfire, changing flat tire, etc.

Figure 2:
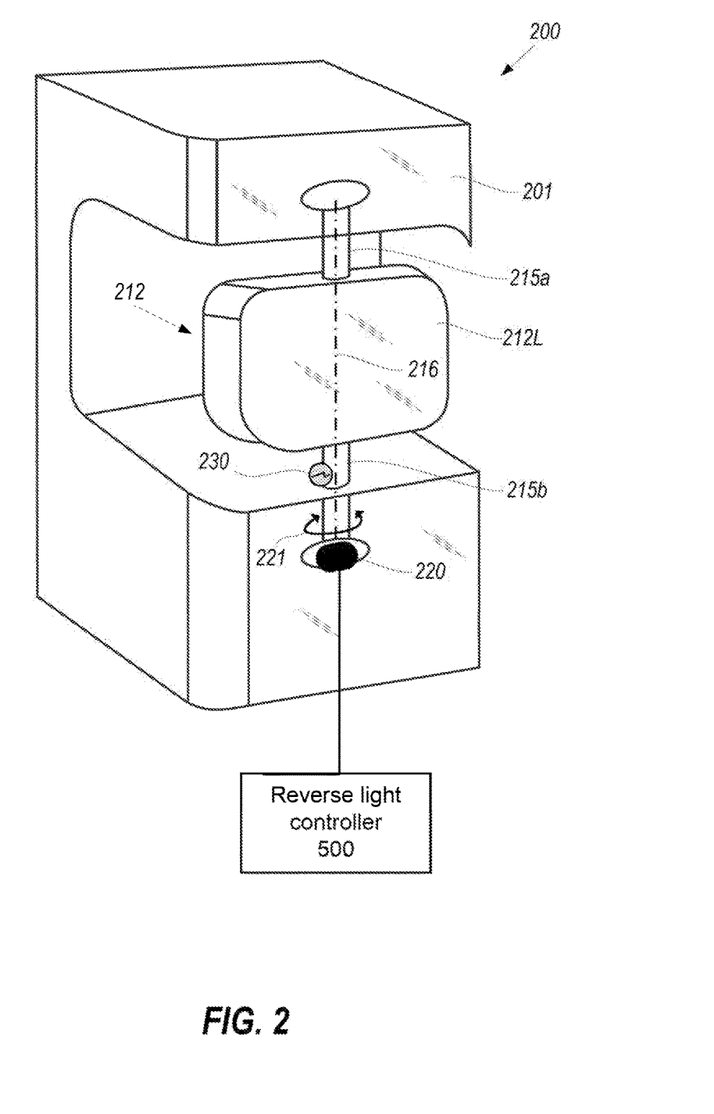
FIG. 2 illustrates a mechanism of the rotatable reverse light according to an exemplary embodiment of the present disclosure.

The structure of the rotatable reverse light 112 that enables the rotatable reverse light 112 to perform multiple functions is illustrated in FIG. 2. In FIG. 2, a taillight 200, which is an implementation of the taillight 110, includes a rotatable reverse light 212. The rotatable reverse light 212, which is an implementation of the rotatable reverse light 112, is interchangeably used to refer to the rotatable reverse light 112. The taillight 200 can be a left taillight or a right taillight.

The rotatable reverse light 212 includes a reverse light 212L mounted on a rotating axis of shafts 215a and 215b (collectively referred as shaft 215) to direct a white light from the reverse light 212L in predetermined direction or in a desired direction. The reverse light 212L is connected to shaft 215 such that there is no relative motion between the reverse light 212L and the shaft 215. The shaft 215 is further configured to rotate about a longitudinal axis 216 (i.e., a vertical axis) of the shaft 215 to allow relative rotation of the reverse light 212L with respect to an adjacent lamp 214. The adjacent lamp 214 is an implementation of the adjacent lamps 114.

In some implementations, the shaft 215 can be removably connected to the adjacent lamps 214 to allow replacement of the reverse light 212L. For example, the shaft 215 can be spring loaded telescopic shaft 215 that reduces in length when a vertical force is applied, and can be removed by sliding the reverse light 212L out of the taillight 200. In some implementations, the reverse light 212L can be rotated by hand, or automatically via a motor 220 and the controller 500.

The rotatable reverse light 212 can be operably connected to the motor 220 and the reverse light controller 500. The motor 220 can drive the shaft 215b to rotate and orient the reverse light 212L to a predetermined or a desired position. Optionally, a sensor 230 such as a position sensor can be included to measure a position of the reverse light 212L or the motor 220.

FIGS. 3A-3D illustrate different positions of the rotatable reverse lights 312 and 322, which are an implementation of the rotatable reverse light 212. In FIGS. 3A-3D, the rotatable reverse light 312 is part of a left taillight and the rotatable reverse light 322 is part of a right taillight. A position of the rotatable reverse light 312 (or 322) can be defined with respect to a horizontal axis 301 (or 301'), defined along a length of a vehicle and passing through the rotatable reverse light 312 (or 322).

Figure 3A:
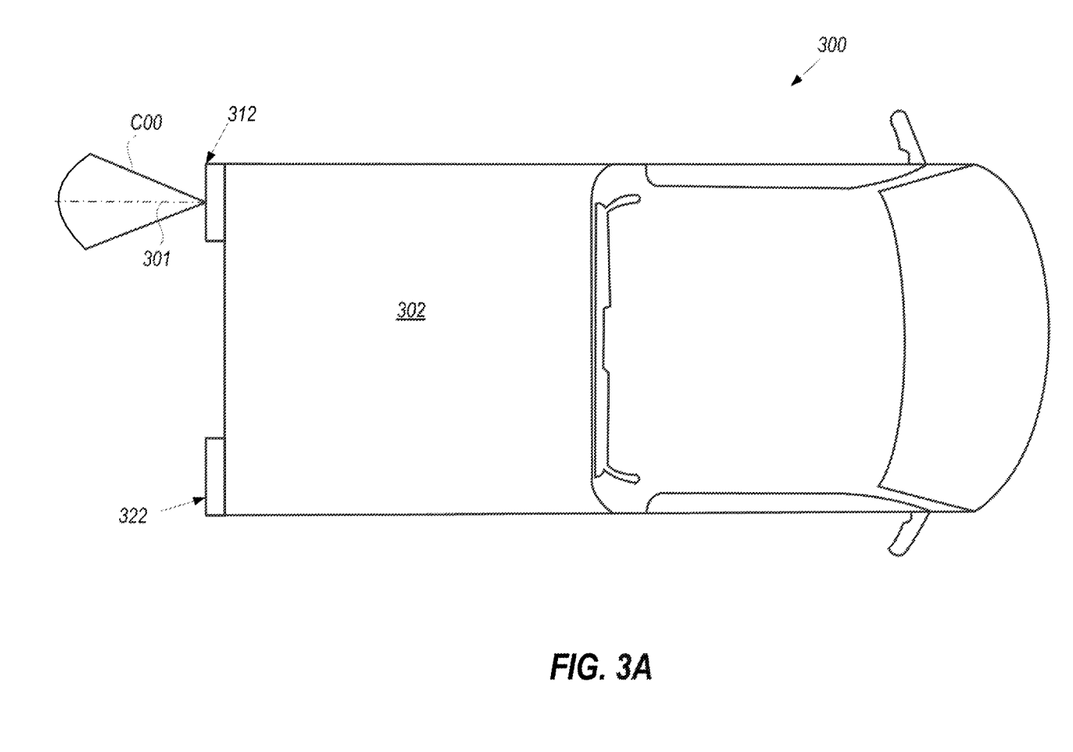
FIG. 3A illustrates the rotatable reverse light in a first (or normal) orientation according to an exemplary embodiment of the present disclosure.

In FIG. 3A, the rotatable reverse light 312 is in the normal position directing the light in a direction along the horizontal axis 301 creating a light cone C00. The light cone C00 refers to an illuminated area at a rear end of the vehicle, for example, to warn and illuminate when backing up. In some implementations, the normal position can be one of the predetermined positions. Other predetermined position or desired position can be an inward position, an outward position, or a combination thereof.

Figure 3B:
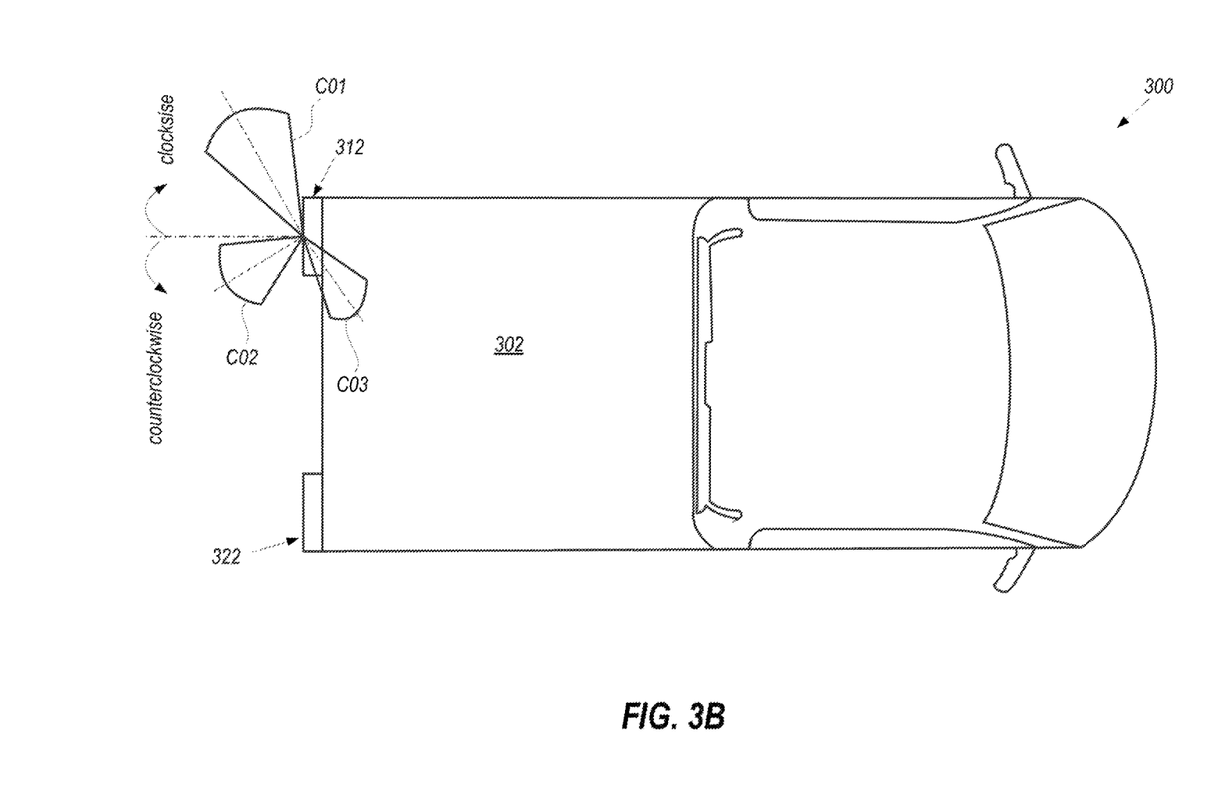
FIG. 3B illustrates the rotatable reverse light in different orientations according to an exemplary embodiment of the present disclosure.
Figure 3C:
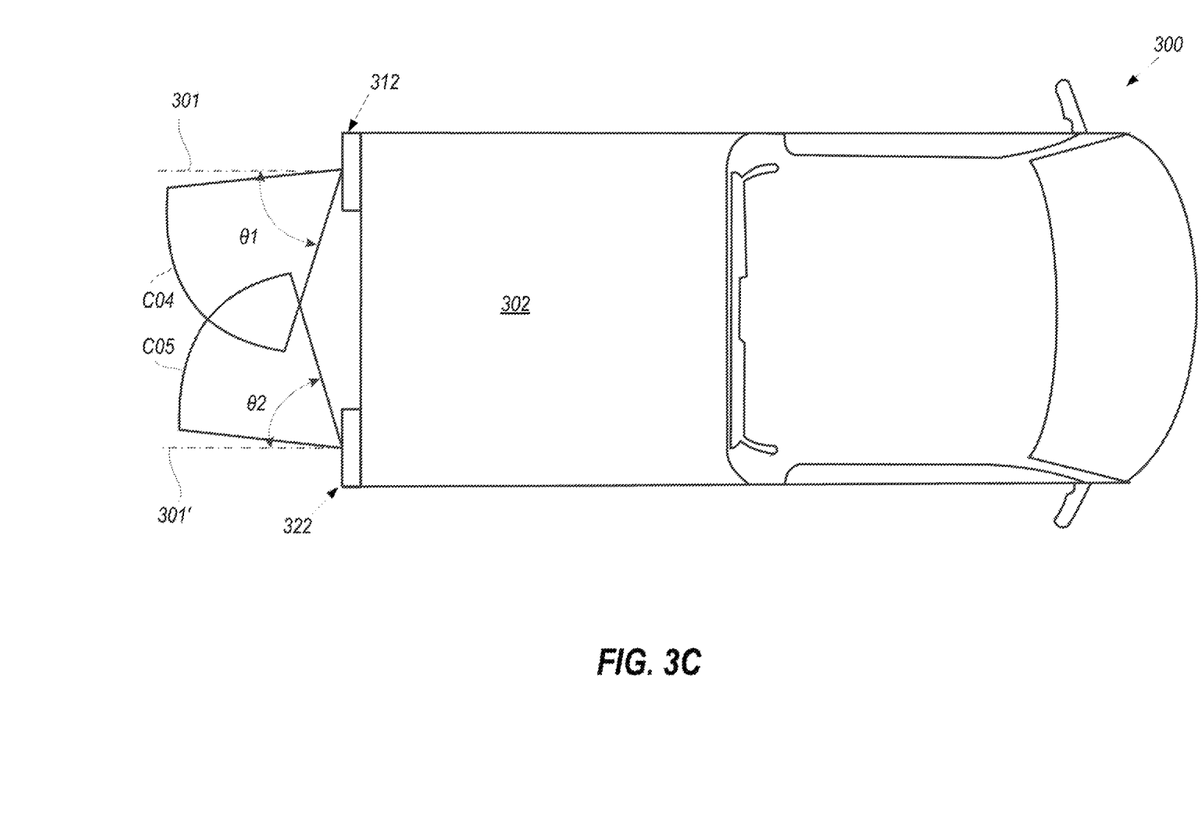
FIG. 3C illustrates two rotatable reverse light orientated towards each other according to an exemplary embodiment of the present disclosure.

An inward position refers to a position of the rotatable reverse light 312 (or 322) when rotated towards the bed of the vehicle. For example, in FIGS. 3B and 3C, the rotatable reverse light 312 can be rotated in a counterclockwise direction, while the rotatable reverse light 322 can be rotated in a clockwise direction. In some implementation, one or both of the rotatable reverse light 312 and 322 can be rotated. As shown in FIG. 3B, in the inward position, the rotatable reverse light 312 creates a light cone C02 or C03, depending on an angle of rotation, which illuminates a region within or around a bed 302 of the vehicle 300. A similar inward position of two reverse lights generates light cones C04 and C05, as shown in FIG. 3C. In FIG. 3C, the rotatable reverse light 312 is rotated counterclockwise at an angle θ1 with respect to the horizontal axis 301, while the rotatable reverse light 322 is rotated clockwise at an angle θ2 with respect to the horizontal axis 301'. In some implementations, the angles θ1 and θ2 may be similar or different depending on the intended use. The inward position can be used, for example, to load/unload things from the bed 302 of the vehicle 300.

Figure 3D:
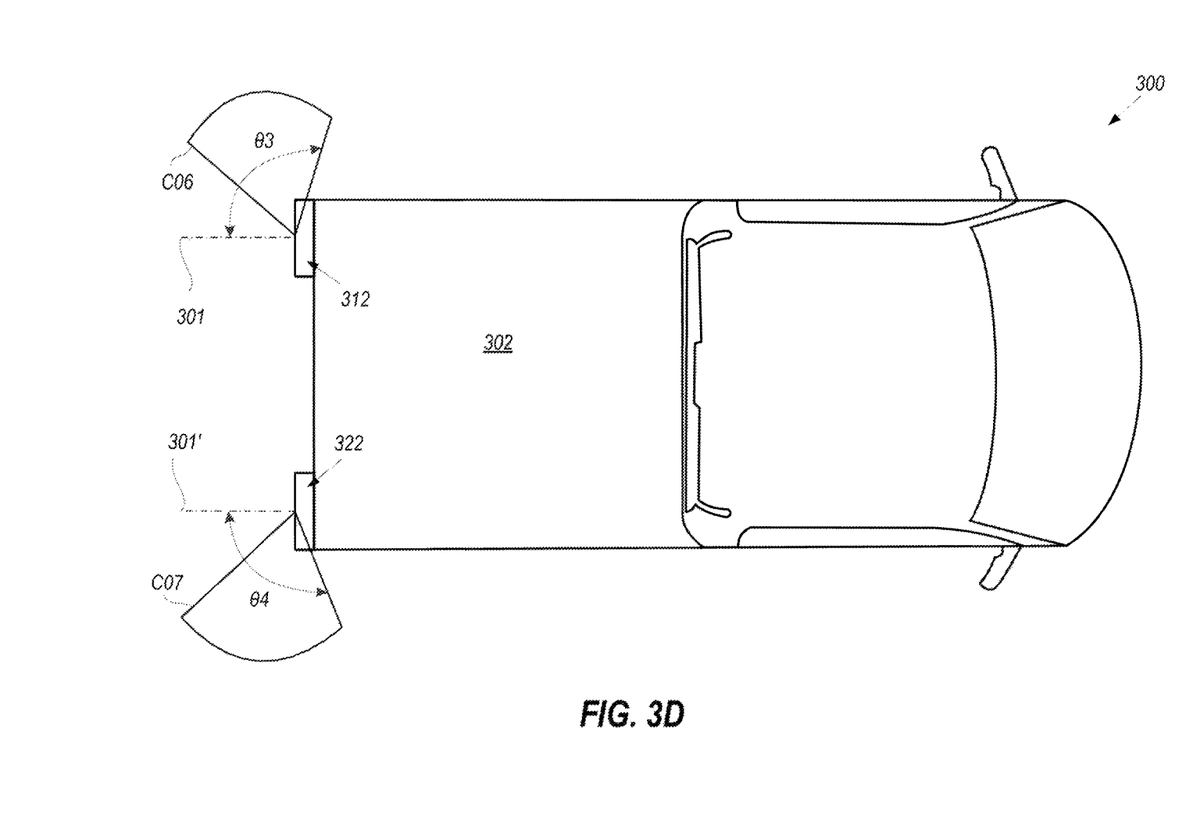
FIG. 3D illustrates two rotatable reverse light orientated away from each other according to an exemplary embodiment of the present disclosure.

Referring to FIGS. 3B and 3D, an outward position refers to a position of the rotatable reverse light 312 (or 322) rotated towards the bed of the vehicle. For example, the rotatable reverse light 312 can be rotated clockwise, while the rotatable reverse light 322 can be rotated counterclockwise. In some implementation, one or both of the rotatable reverse light 312 and 322 can be rotated. As shown in FIG. 3B, in the outward position, the rotatable reverse light 312 creates a light cone C01 which illuminates a region along a side of the vehicle 300. A similar outward position of two reverse lights generates light cones C06 and C07, as shown in FIG. 3D. In FIG. 3D, the rotatable reverse light 312 is rotated clockwise at an angle θ3 with respect to the horizontal axis 301, while the rotatable reverse light 322 is rotated counterclockwise at an angle θ4 with respect to the horizontal axis 301'. In some implementations, the angles θ3 and θ4 may be similar or different depending on the intended use. The outward position can be used, for example, to change flat tire, or set up a camp.

Referring back to FIG. 2, in some implementations, the rotation signal is generated by the controller 500. The controller 500 further transmits the rotation signal to the motor 220, which rotates the reverse light 212L to the desired position. The controller 500 can generate rotation signal based on a driving mode of the vehicle (e.g., parking mode, a reverse mode, or other driving modes), and a current position of the reverse light 212L. The current position of the reverse light 212L can be provided by a position sensor, an amount of rotation and a direction of rotation of the motor 220, or a combination thereof. The amount of rotation and the direction can be predetermined by the user input or the vehicle's programming for the ATL module. For example, to determine the amount and direction of rotation of the motor 220, the controller 500 can include a rotation monitoring circuitry configured to monitor and store rotation information (e.g., degree of rotation, direction of rotation, etc.) of the motor 220 and use a current position information to determine an orientation of the reverse light 212L. For example, the current position can be that the motor 220 was instructed to rotated the reverse light 212L in counterclockwise by 10°. The controller 500 can use the current position information, when the vehicle is removed from the park mode, to generate an another rotation signal (opposite to that of the current position or relative to the normal position) to the motor 220 so that the reverse light 212L rotates in, for example, clockwise direction by 10°, to return the reverse light 212L to the normal position.

In some implementations, the controller 500 can be configured to allow rotation of the reverse light 212L when the vehicle 100 (or 300) is in parked mode, and resume to normal (or standard) operation during other driving modes. If the vehicle 100 is taken out of parking mode, the reverse lights returns to the normal position to satisfy the reverse regulatory requirement. Furthermore, in some implementations, the controller 500 can also be configured to rotate the rotatable reverse lights in conjunction with a rear backup camera system (not illustrated), commonly found in a vehicle. For example, the rotatable reverse lights can be rotated to follow curve guidelines typically seen in the backup camera system.

In some implementations, the controller 500 can generate the rotation signal based on a user input (not illustrated) transmitted via a user device such as a keyfob or a smart phone. The user device can include processing circuitry configured to the receive user inputs to rotate the rotatable reverse light 312 clockwise by 10° and the rotatable reverse light 322 counterclockwise by 10°.

Figure 4:
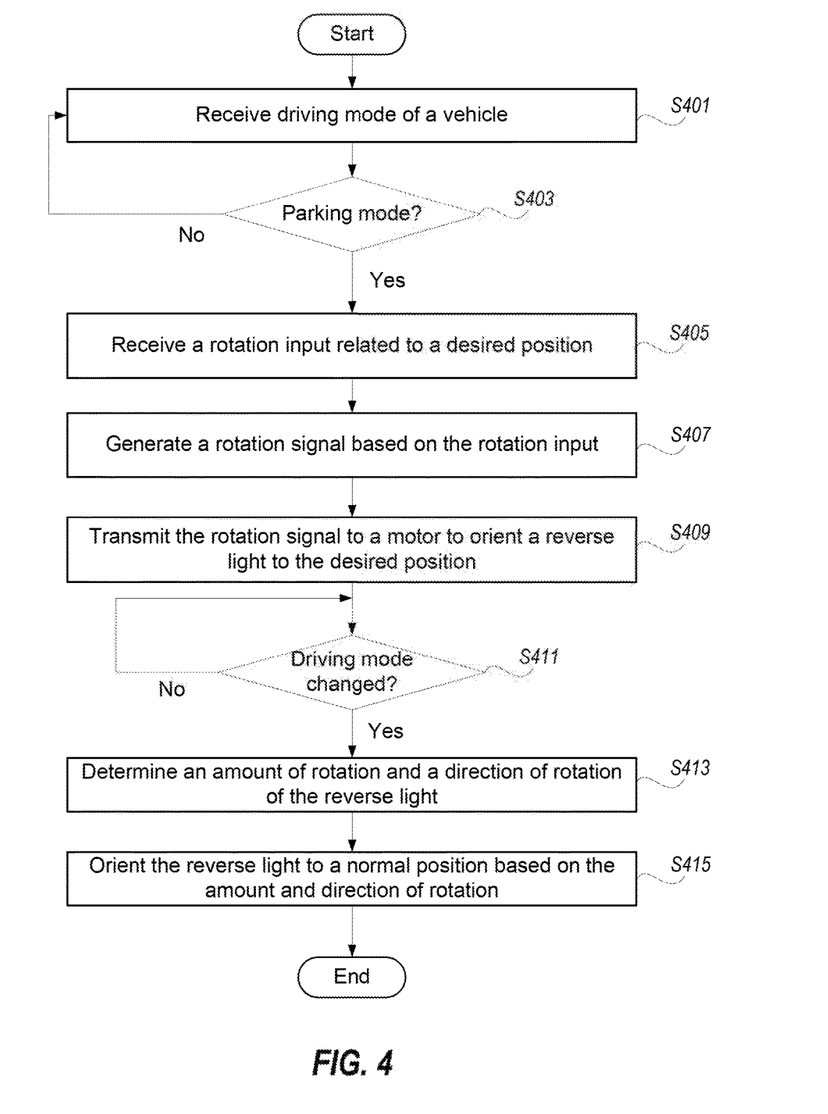
FIG. 4 is a flow chart for a reverse light controller that controls the rotatable reverse light according to an exemplary embodiment of the present disclosure.

FIG. 4 is a flow chart for the reverse light controller 500 (also referred as controller 500) to control the rotatable reverse light 212 (or 312 and 322) according to an exemplary embodiment of the present disclosure. The process starts when the rotatable reverse light 212 (also be referred as an ATL module) is activated. The ATL module can be activated when the vehicle is ON or OFF.

In step S401, the controller 500 can receive the driving mode (e.g., a forward drive mode, a reverse mode, a neutral mode, or a parking mode) of the vehicle. The driving mode can be transmitted, for example, by an electronic controller unit (ECU) of the vehicle.

In step S403, the controller 500 determines whether the vehicle 100 is in the parking mode (or reverse mode). If the vehicle 100 is not in the parking mode (or reverse mode), the reverse light 212L should not be rotated, thus the controller 500 returns for step S401 and till the driving mode is changed to the parking mode.

When the vehicle 100 is in the parking mode, in step S405, the controller 500 can receive a rotation input related to a desired position. The rotation input can be provided by a user via a keyfob (not illustrated) or other user device (not illustrated) configured to transmit a position signal such as amount of rotation, direction of rotation or other position related parameters. For example, the keyfob can include a "+" and "−". The "+" button can be used to rotate the reverse light 212L in clockwise direction and each push can increase the amount of rotation by, for example, 10°. Thus, if the reverse light 212L is to be rotated by 30° away from the bed of the vehicle, the user can push "+" button on the keyfob three times. In some implementations, the amount of rotation, direction of the rotation and reverse light (left/right) can be entered numerically via an software interface such an app on a smartphone. In some implementations, the rotation inputs can be generated by an ECU of the vehicle 100 based on guidelines generated by the backup camera circuitry, or other appropriate circuitry within the vehicle 100.

In step S407, the controller 500 generates a rotation signal based on the rotation input. Further, the controller 500 transmits the rotation signal to the motor 220 to orient the reverse light 212L to the desired position, in step S409.

In step S411, the controller 500 determines whether the driving mode of the vehicle has changed from the parking mode (or reverse mode) to a forward drive mode or neutral mode. If the driving mode remains the same, the controller 500 keeps detecting for a change in the driving mode.

When the driving mode of the vehicle changes, in step S413, the controller 500 determines a rotated position of the reverse light (i.e., an amount of rotation and a direction of rotation) of the reverse light and generates a rotation signal to return the reverse light 212L to the normal position. In step S415, the controller 500 orients the reverse light to the normal position, via the motor 220.

Each of the functions of the described embodiments may be implemented by one or more processing circuits. A processing circuit includes a programmed processor (for example, a CPU 501), as a processor includes circuitry. A processing circuit may also include devices such as an application specific integrated circuit (ASIC) and conventional circuit components arranged to perform the recited functions.

Figure 5:
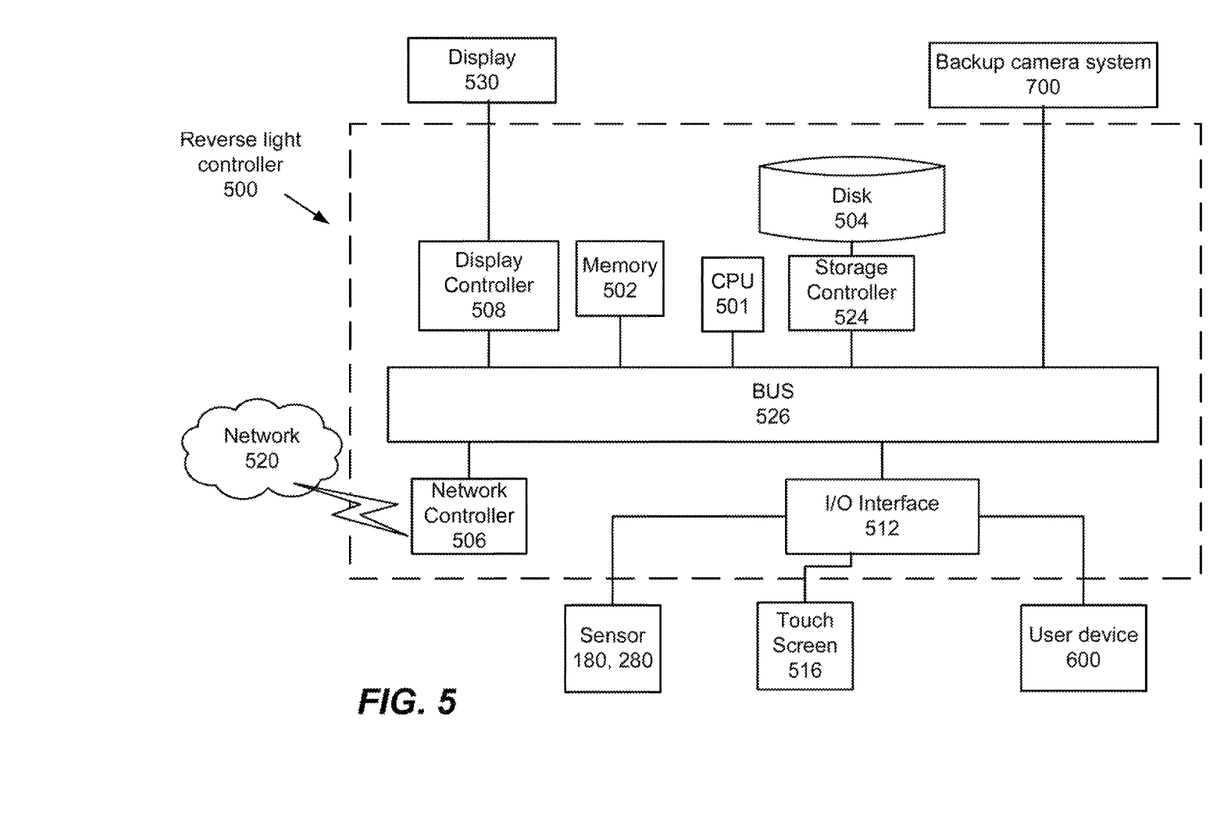
FIG. 5 is a block diagram illustrating the reverse light controller according to an exemplary embodiment of the present disclosure.

FIG. 5 is a block diagram illustrating the reverse light controller 500 according to an exemplary embodiment of the present disclosure. In FIG. 5, the reverse light controller 500 includes a CPU 501 which can be configured to receive inputs from one or more sensors 230, and/or the user device 600, process the data received to transmit a rotation signal to the rotatable reverse light 212. The CPU 501 can be further configured to send a current position of the rotatable reverse light 212 to a display 530 of a vehicle console or a user device 600 connected to the controller 500. The process data and instructions may be stored in the memory 502. Furthermore, the controller 500 can be configured to receive input (e.g., guidelines) from a backup camera system 700 of the vehicle to determine an angle of rotation of the rotatable reverse light 212. The user device 600 can be a keyfob, a smart phone, or other relevant electronic unit configured to provide rotation inputs and communicate with the controller 500.

The hardware elements, in order to achieve the reverse light controller 500, may be realized by various circuitry elements, known to those skilled in the art. For example, CPU 501 may be a XENON or Core processor from INTEL of America or an Opteron processor from AMD of America, or may be other processor types that would be recognized by one of ordinary skill in the art. Alternatively, the CPU 501 may be implemented on an FPGA, ASIC, PLD or using discrete logic circuits, as one of ordinary skill in the art would recognize. Further, CPU 501 may be implemented as multiple processors cooperatively working in parallel to perform the instructions of the processes described above with respect to FIG. 4.

The CPU 501 which performs the processes described in the present disclosure. The process data and instructions may be stored in a memory 502. These processes and instructions (discussed with respect to FIG. 4) may also be stored on a storage medium disk 504 such as a hard drive (HDD) or portable storage medium or may be stored remotely.

The reverse light controller 500 further includes a display controller 508, such as a NVIDIA GeForce GTX or Quadro graphics adaptor from NVIDIA Corporation of America for interfacing with display 530. A touch screen panel 516 may be on or separate from display 530.

The reverse light controller 500 also includes a network controller 506 for interfacing with a network 520. Such network based interfacing can be useful to send commands, sensor data, or rotation signal to an external device such as the display 530, user device 600, the keyfob, the backup camera system 700, etc.

An I/O interface 512 interfaces with one or more sensor 230, user device 600, and the touch screen 516 of the display 530, etc. to send and receive inputs or to send rotation signals to the rotatable reverse light 212 (or 312, or 322).

The storage controller 524 connects the memory 502 with communication bus 526, which may be an ISA, EISA, VESA, PCI, or similar device, for interconnecting all of the components of the reverse light controller 500. A description of the general features and functionality of the storage controller 524, the display controller 508, network controller 506, and the I/O interface 512 is omitted herein for brevity as these features are known.

The rotatable reverse light 110 (and 120, 200, etc.) is rotatable and provide several advantages over a typical reverse light. The rotatable reverse light 100 can perform multiple functions including warning and illumination when backing up, and ATL without addition of extra lamps or lighting apparatus. The ATL can help a user at night while working in the bed 102 of the truck (ex: unloading cargo from the bed of the truck), setting up a tent, campfire, changing flat tire, etc.

While certain embodiments have been described, these embodiments have been presented by way of example only, and are not intended to limit the scope of the present disclosures. Indeed, the novel apparatuses and systems described herein can be embodied in a variety of other forms; furthermore, various omissions, substitutions and changes in the form of the apparatuses and systems described herein can be made without departing from the spirit of the present disclosures. The accompanying claims and their equivalents are intended to cover such forms or modifications as would fall within the scope and spirit of the present disclosures.

What is claimed is:

1. A rotatable reverse light of a vehicle comprising:
   a reverse light;
   a shaft connected to the reverse light and configured to rotate the reverse light;
   a motor connected to the shaft to rotate the reverse light about a longitudinal axis of the shaft to orient the reverse light to a desired position; and
   a reverse light controller configured to
      receive a driving mode of a vehicle,
      in response to a parking mode of the vehicle, receive a rotation input related to the desired position,
      generate a rotation signal based on the rotation input, and
      transmit the rotation signal to the motor to orient the reverse light to the desired position.

2. The reverse light according to claim 1, wherein the shaft is a spring loaded to facilitate replacement of the reverse light.

3. The reverse light according to claim 2, wherein the spring loaded shaft is telescopic.

4. The reverse light according to claim 1, wherein the rotation input includes an amount of rotation and a direction of rotation.

5. The reverse light according to claim 1, wherein the controller is further configured to detect a change of driving mode from the parking mode,
- in response to the mode change, determine an amount of rotation and a direction of rotation based on a current position of the motor, and
- orient the reverse light to a normal position based on the amount and the direction of rotation determined.

6. The reverse light according to claim 1, wherein the controller is further configured to control an intensity of the reverse light.

7. A rotatable reverse light of a vehicle comprising:
- a reverse light;
- a shaft connected to the reverse light and configured to rotate the reverse light;
- a position sensor configured to measure a position of the reverse light;
- a motor connected to the shaft to rotate the reverse light about a longitudinal axis of the shaft to orient the reverse light to a desired position; and
- a reverse light controller configured to
  - receive a driving mode including a parking mode of a vehicle,
  - in response to the parking mode of the vehicle, receive a rotation input related to the desired position and the position of the reverse light,
  - generate a rotation signal based on the rotation input and the position of the reverse light, and
  - transmit the rotation signal to the motor to orient the reverse light to the desired position.

8. The reverse light according to claim 7, wherein the shaft is a spring loaded to facilitate replacement of the reverse light.

9. The reverse light according to claim 8, wherein the spring loaded shaft is telescopic.

10. The reverse light according to claim 7, wherein the rotation input includes an amount of rotation and a direction of rotation.

11. The reverse light according to claim 7, wherein the controller is further configured to detect a change of driving mode from the parking mode,
- in response to the mode change, determine an amount of rotation and a direction of rotation based on a current position of the motor, and
- orient the reverse light to a normal position based on the amount and the direction of rotation determined.

12. The reverse light according to claim 7, wherein the controller is further configured to control an intensity of the reverse light.

13. A taillight of a vehicle comprising:
- a reverse light;
- a brake light surrounding the reverse light;
- a shaft to rotate the reverse light and the brake light configured to rotate the reverse light relative to the brake light;
- a motor connected to the shaft to rotate the reverse light in a desired position; and
- a reverse light controller configured to
  - receive a driving mode of a vehicle,
  - in response to a parking mode, receive rotation input;
  - generate rotation signal; and
  - transmit the rotation signal to the motor to orient the reverse light to the desired position.

14. The taillight according to claim 13, wherein the shaft is a spring loaded to facilitate replacement of the reverse light.

15. The taillight according to claim 14, wherein the spring loaded shaft is telescopic.

16. The taillight according to claim 13, wherein the rotation input includes an amount of rotation and a direction of rotation.

17. The taillight according to claim 13, wherein the controller is further configured to detect a change of driving mode from the parking mode,
- in response to the mode change, determine an amount of rotation and a direction of rotation based on a current position of the motor, and
- orient the reverse light to a normal position based on the amount and the direction of rotation determined.

18. The taillight according to claim 13, wherein the controller is further configured to control an intensity of the reverse light.

* * * * *